US009485647B2

(12) United States Patent
Mohebbi et al.

(10) Patent No.: US 9,485,647 B2
(45) Date of Patent: Nov. 1, 2016

(54) PROVIDERS OF UBARR SUBSCRIPTION-BASED SERVICES

(71) Applicant: IT Curves LLC, Gaitherbsurg, MD (US)

(72) Inventors: Matthew Mohebbi, Potomac, MD (US); Cosmin Vlad Ditu, Gaithersburg, MD (US)

(73) Assignee: IT Curves LLC, Gaithersburg, MD (US)

( * ) Notice: Subject to any disclaimer, the term of this patent is extended or adjusted under 35 U.S.C. 154(b) by 450 days.

(21) Appl. No.: 13/926,856

(22) Filed: Jun. 25, 2013

(65) Prior Publication Data

US 2014/0378118 A1    Dec. 25, 2014

(51) Int. Cl.
  *G06F 13/00*   (2006.01)
  *H04W 8/06*    (2009.01)
  *H04W 4/00*    (2009.01)

(52) U.S. Cl.
  CPC ............... *H04W 8/06* (2013.01); *H04W 4/003* (2013.01)

(58) Field of Classification Search
  CPC ........... B03C 1/22; B03C 1/14; B03C 1/034; B03C 1/035; B03C 1/08; A63F 13/12; A63F 2300/407; A63F 2300/50; G07F 17/32; G07F 17/323; H04W 8/06; H04W 4/003
  USPC ............................................. 463/42; 709/225
  See application file for complete search history.

(56) References Cited

U.S. PATENT DOCUMENTS

| | | | |
|---|---|---|---|
| 2002/0147049 A1* | 10/2002 | Carter, Sr. | 463/42 |
| 2008/0254887 A1* | 10/2008 | Kiong | 463/42 |
| 2008/0293494 A1* | 11/2008 | Adiraju et al. | 463/42 |
| 2008/0300049 A1* | 12/2008 | Anderson et al. | 463/25 |
| 2009/0170596 A1* | 7/2009 | Gagner et al. | 463/25 |
| 2009/0203432 A1* | 8/2009 | Carter, Sr. | 463/25 |
| 2012/0077594 A1* | 3/2012 | Carter, Sr. | 463/42 |

* cited by examiner

*Primary Examiner* — Robert B Harrell
(74) *Attorney, Agent, or Firm* — Thomas Heed

(57) ABSTRACT

A user subscription profile for a subscription-based mobile application in a wireless mobile device is established with a first mobile application service provider. The wireless device requests service for the mobile application from a second mobile application service provider. The user's subscription profile for the mobile application service is either communicated to the second mobile application service provider, or the mobile application required and allowed service information is accessed from the second mobile application service provider to enable the mobile application service to function with the second mobile application service provider as though the mobile application service were operating within the service area of the first mobile application service provider consistent with the requirements of the second mobile application service provider.

28 Claims, 8 Drawing Sheets

PROVIDERS OF UBARR SUBSCRIPTION-BASED SERVICES

FIELD OF THE DISCLOSURE

This disclosure relates to a mobile application roaming method and system.

BACKGROUND OF THE DISCLOSURE

Universal roaming is a concept that has been practiced in cellular systems and particularly in Global System for Mobile communication (GSM) for over two decades now. Enjoying their mobile communications, cellular subscribers travel from coverage areas of one Public Land Mobile Network (PLMN) to those of another PLMN, expecting a seamless hand over and continuity of service. Furthermore, subscribers expect the roaming PLMN to understand and operate according to their subscription profile and based on their contracts with their home PLMN operator. When the roaming PLMN happens to be in a different geographical region (e.g., state or country) with different regulations, tariffs and taxations, cellular subscribers expect the roaming PLMN and home PLMN together will manage to resolve all the differences and the home PLMN will provide the user with a single bill. The subscribers may be charged certain roaming charges for the services they utilized while using the roaming PLMN cells. Pre-planning and pre-paid services are provisioned by the network of participating PLMNs to reduce or eliminate these charges.

The advancement and wide spread availability of wireless data services and powerful smart devices in the last few years has led to the creation and rapid usage of mobile applications (or apps). As these mobile apps become more sophisticated, some of them may become involved with providing services that are regulated by local jurisdictional governments; these apps make the locally regulated businesses available globally. The apps are designed to operate from, and under the control of a Mobile App Service Provider (MASP), which in some cases try to embed local taxes and some of the regulations in their hosted solutions. However, these centrally controlled apps and the services they provide bypass the locally regulated and licensed operators, which dilute or eliminate the liabilities and the purpose of local regulations and licensing. Global app availability is positive and desirable; however, the administration of regulations becomes very difficult and the responsibility and goal of locally licensed operators are thereby diminished.

SUMMARY

This disclosure relates to a mobile application roaming method and non-volatile computer readable medium. A user subscription profile for a subscription based mobile application in a wireless mobile device is established with a first mobile application service provider. The wireless device requests service for the mobile application from a second mobile application service provider. The user's subscription profile for the mobile application service may be communicated to the second mobile application service provider. The mobile application required and allowed service information may be accessed from the second mobile application service provider to enable the mobile application service to function with the second mobile application service provider as though the mobile application service were operating within the service area of the first mobile application service provider consistent with the requirements of the second mobile application service provider.

BRIEF DESCRIPTION OF THE DRAWING

Embodiments are described with reference to the accompanying drawings, which are incorporated herein and form a part of the specification. Together with the description, the drawings further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Figure 1:
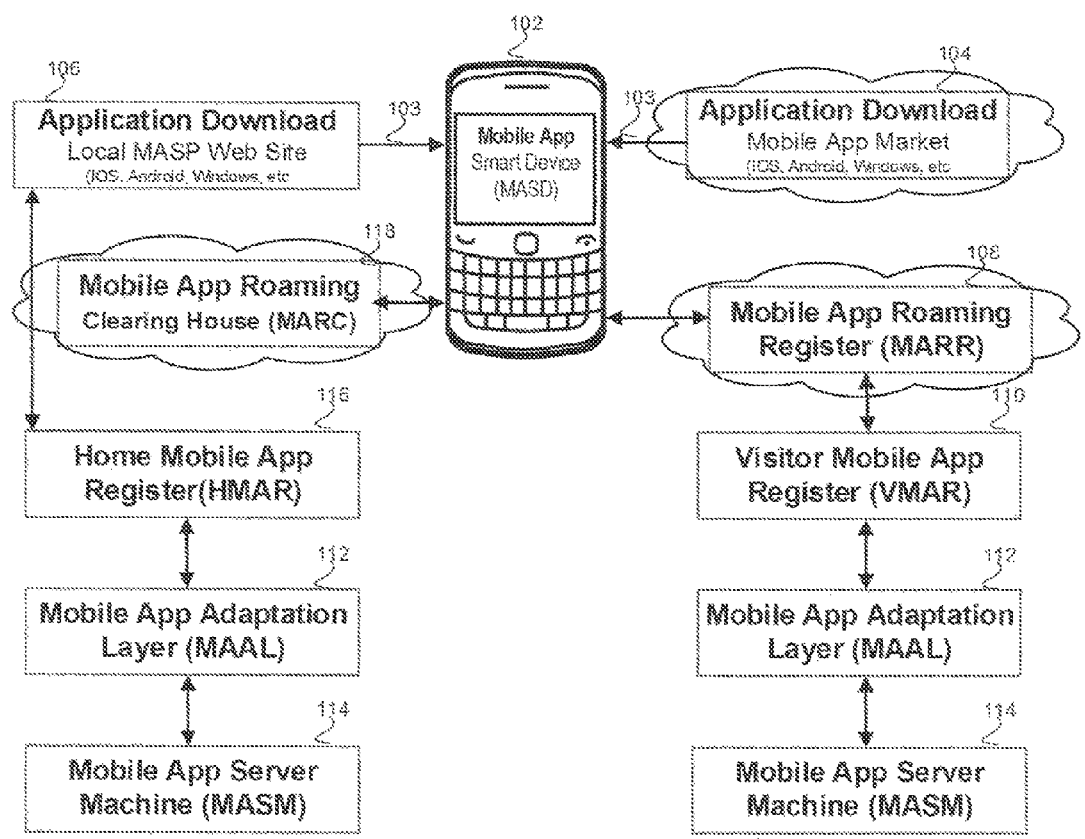
FIG. 1 shows the major components of the Mobile Application Roaming System of this invention.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. This invention may be embodied in hardware, software, firmware, or any combination thereof.

In addition, in the present disclosure, the term "communicating" is intended to include sending, receiving, or otherwise making available certain information.

The present disclosure provides a solution to the above-mentioned problem by allowing global availability of certain regulated services via a single familiar app or multiple interoperable apps while directly utilizing the service via locally licensed operators. A Mobile Application Roaming System (MARS), similar to cellular roaming, allows users of regulated services to subscribe to a single entity (or selected entities), a home MASP, which itself may be a local service provider, and then roam to other licensed service providers and receive the same services from a roaming MASP. The home MASP will maintain a user's subscription profiles, which may include their identification, account information, services profiles and other credentials. When users request services in the coverage area of a roaming MASP, they will receive the required and allowed information from the roaming MASP and accordingly will accommodate the requested services adapted to local regulations, tariffs and taxations. This disclosure defines the architecture of the MARS, its characteristics, features and attributes. Furthermore, it shows the MARS application in the context of certain examples of services that will benefit from the MARS application to improve the quality, safety, and regulatory compliance of these services. These examples are not meant to be exhaustive and are only used to clarify the concept and usage of the MARS. The MARS allows subscribers to use the same mobile app on their mobile device (e.g., laptop, table, cell phone) and maintain similar services in all parts of the world, while receiving the service from a locally licensed operator fully compliant with local regulations, laws, language, currency and taxations.

Two examples of mobile applications that can utilize MARS are mobile games, and mobile apps for booking transportation services. In gaming examples, there may be state or local jurisdictional laws that allow certain games and prohibits others. Furthermore, there may be imposed limits on the amount of wins or losses, or imposed geographical restrictions on the areas where such games are allowed. Local governments may wish to restrict the administration of some games, like lotteries, to locally licensed operators, and to participants that are physically located in certain areas. Similarly, in transportation, often the locally licensed operators bounded by their license agreements and local regulations, are the only allowed providers of these services. These operators must comply with restrictions such as the area of pickup and drop off, regulated fares, quality of services, as well as other regulatory codes. These regulations were created for the safety, comfort and protection of riders. An independent operator is not licensed to operate in all jurisdictions. These independent operators directly provide the bookings to drivers, bypassing the fleet operators and potentially diluting the fleet operators' responsibilities and liabilities. The MARS takes a very different approach by providing a single app which is able to roam into a local operator's area and directly book the service into the local operator's booking system. Since the locally licensed operator is fully aware of local regulations, it adapts the service to be compliant with local covenants. The MARS architecture is designed to allow for a variety of local practices ranging from direct electronic booking, to email, or even phone calls to the local operators. Attributes of the two examples illustrating the MARS applications are described below.

Gaming: at the present time, many states have laws to restrict certain games or gaming attributes. Game operators are licensed and comply with the terms of their licenses. Some states restrict the games to certain cities within the state and even further may restrict them to specific facilities within a city. These laws and regulations are simple to administer if the licensed operators are brick and mortar operators. The purpose of these regulations is twofold: protection of the public and management of the states' revenues from associated fees and taxations.

As gaming is made available electronically and more so offered via mobile electronic devices, the administration of regulatory objectives is at risk. These regulations were created for a reason and their dilution will impose risks to public safety and to a jurisdictional government's ability to maintain their revenue base. Mobile apps could make casino games available anywhere and available from certain central locations which may be located and administered by an off-shore company. Widespread use of mobile gaming can upset these restrictions or stipulations.

The MARS addresses these issues by allowing mobile apps users to transparently be logged into a local operator's system. Users enjoy the same game, but under the control of a locally licensed operator which assures compliance with local regulations and protects the jurisdictional government revenue stream and tax collection from these games.

Transportation:

MARS has a very effective utility for providing public transportation booking and services including taxi, limousine, and rideshare services. The reason for this suitability stems from several factors, including:

Most often the local taxicab, limousine and other transportation service providers are licensed by the local jurisdictional governments and are regulated.

Regulations on these service providers range from the quality of service, fare structure, area of service, charging method, to refusal of services.

Local operators' brand names and administration of their licenses makes them accountable and liable. Bypassing the local operators will create ambiguity in the levels of their accountability and liability.

Transportation services rates and fares are considerably different from one area to another, from one type of service to another, or even by the attributes of requested services. In global operations, these differences extend to include currency differences as well as tax laws that may vary from one operation to another.

When a user's app is designed to book taxis and limousines, the best technique is to use the fleet operators booking system, since this system is aware of all local regulations as well as the attributes of services, drivers, and vehicles. The MARS makes it possible to have a single familiar app or a number of interoperable apps that is or are provided directly by a local operator, such as a taxicab company, or are downloadable from an app marketplace, which allows booking into any participating MASP around the world.

MARS Network Architecture

The MARS system is composed of several processors in a global computing cloud. Some of these processors function globally and cover the operation of a user's mobile device throughout the entire network. Other processors are located at a local MASP operations center and provide specific functions for the local MASP. Major components of the MARS and some of their designated functions are described below. Each of these components may be a combination of a number of processors in a distributed processing environment. The design may be described in the context of the examples of certain previously mentioned applications. However, the design is applicable to many applications. In general, the design is applicable to any application that can utilize roaming of mobile device apps to a different network or different operator of such apps, and in particular to subscription based apps which operate according to certain rules and regulations imposed by local authorities. While roaming, these apps may enjoy their normal functionality while maintaining compliance with applicable laws and regulations that apply to the location where the services are rendered and the apps are being used.

FIG. 1 shows the overall architecture of the MARS. The MARS comprises a mobile smart device (MASD) 102 (e.g., a smartphone, tablet computer, notebook, computer, laptop computer, or any other mobile device having the ability to download and run one or more mobile applications, or apps). Smart device 102 has the ability to download a Mobile Application (MASD) 103 from a mobile application marketplace 104 (e.g., Apple's® App Store® or iTunes®, Google's® Android® Market or Google Play®, Blackberry's® Application Center) or from a local Mobile Application Service Provider (MA.SP) 106. If MASD 102 is roaming away from its home MASP 106, MASD 102 can communicate with a Mobile Application Roaming Register (MARR) 108. I\{ARR 108 in turn communicates with a Visitor Mobile App Register (VMAR) 110, a Mobile App Adaptation Layer (MAAL) 112, and a Mobile App Server Machine (MASM) 114. While operating within its home MASP 106, MASD 102 may communicate with a Home Mobile App Register (HMAR) 116, MAAL 112, and MASM 114. While roaming, MASD 102 may also communicate with a Mobile App Roaming Clearing House (MARC) 118. Some of the above described components may include additional subcomponents without losing the context of the overall architecture.

Mobile App Service Provider (MASP) 106

MASP 106 is an operator of certain mobile app services offered to users via certain mobile apps. MASP 106 may be required and licensed by the local jurisdictional governments to provide such services. The licensing covenant may restrict the services to users that are located within the coverage area of that MASP 106 at the time the service is invoked, requested, or provided. The regulations may be imposed by local jurisdictional governments, including cities, counties, states, and/or countries, or the internal policies of companies. The local MASP 106 may be licensed, monitored and controlled by local jurisdictional governing bodies and thereby their accountability and liability is established and managed by these bodies. The key driver for the MARS is user access to certain services provided by a local MASP 106, each with a clearly defined geographical coverage area for its services, and with certain regulatory obligations or licensing requirements that vary by geographical areas of service. The MARS design allows for multiple MASPs 106 to cover the same or overlapping geographical coverage areas. The priority or selection of overlapping MASPs 106 may be determined by pre-set priorities or rules, or may be left to user selection.

The design of the MARS also allows for a Mobile Apps Virtual Service Provider (MAVSP) (not shown), which is defined as a MASP that does not operate services of its own but offers services through other MASPs. The MAVSP is designed to cover entities such as marketing companies, service brokers, contract management firms, and government institutions. In the transportation business, an example of a MAVSP may be an insurance company, a hospital, or government entity which books transportation services or provides funding for its patrons through a third party ambulance operator, a taxicab operator, or other transportation service provider.

Mobile Application for Smart Devices (MASD) 103

The Mobile Application for Smart Device (MASD) 103, like most other mobile apps, may be downloaded from the markets. They may be supported by the device manufacturers or other common markets such as Apple's® iTunes®, or Android's® Google Play®. The MARS architecture also allows some special apps to be downloaded from a local operator of a MARS web site or other designated source. Downloading from local websites is designed to encourage the local MASPs 106 to create recognition for their local brand and gain loyalty of local users while allowing usage of their app while roaming.

The features of apps acquired from the universal market app include:

Can be downloaded as a generic app or under the brand name of an entity that markets the app to their users;
If the app is downloaded as a generic app, then it may be branded with a generic brand;
The generic app allows roaming to all MASPs 106;
If the app is downloaded under a brand, the brand name of the entity that markets the app will become the main brand for that user;
Branded apps may be restricted by the entity that markets the app to roam only to certain MASPs.

The features of the apps acquired from a specific website include:

App provider may add its own presentation and branding;
App provider may restrict roaming to only certain MASPs.

This is an important and distinctive feature of the MARS that allows a variety of channels to offer MASDs 103 with different characteristics. Generic branding may be offered by associations and general purpose entities where the objective is the promotion of global services. Marketing organizations may brand and offer a MASD 103 under their brand using their marketing capabilities in one or multiple markets, while local users of MARS may download the MASD 103 from their familiar local MASP and maintain the one-to-one relationship with their local MASPs.

Home Mobile App Register (HMAR) 116

The Home Mobile App Register (HMAR) 116 is the server that contains the app user's demographic information, credentials, payment information, preferences and other quality of service driven information. This information will be application oriented and may vary from one application to another. In the gaming example mentioned above, this information may include a user's last scores, financial information, gaming levels and other related information. On the other hand, for transportation services, the information may include a user's demographics, loyalty points, class of service preferences, methods of payments, service restrictions, or other service related preference items.

Mobile App Roaming Register (MARR) 108

The Mobile App Roaming Register (MARR) 108 is the combination of one or more servers that can identify a user's HMAR 116 and direct their apps to local MASPs 106 at a global level. Mobile apps with MARS capabilities first may seek to reach out to their HMAR 116 directly to request service. If the mobile apps cannot reach their HMAR 116, or HMAR 116 cannot provide the required data, then they reach out to MARR 108 to receive alternative service providers that are covering the service based on their location. MARR 108 will first identify and authenticate a user's initial credentials and then allow full authentication with its own HMAR 116 by using combinations of:

Brand name of the app
User's smart device phone number, IMEI or other identification information
Other user IDs that may be entered into the app by the user
MARR 108 will then utilize the location of the user at that time, or another service location the user may want to access in the future and direct the mobile app to a MASP server appropriate for the location where the service will occur.

Visitor Mobile App Register (VMAR) 110

Figure 2:
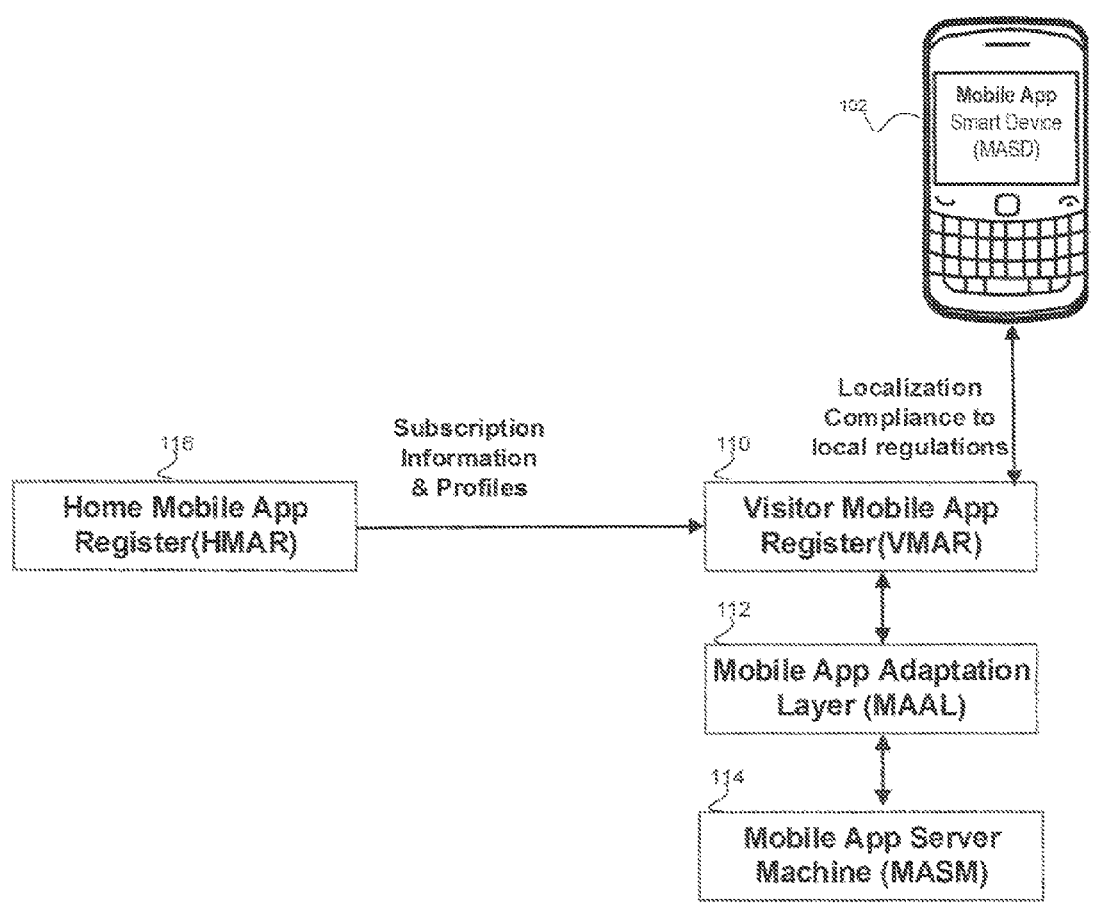
FIG. 2 shows the interaction of the Home Mobile Application Register and the Visitor (Roaming) Mobile Application Register.

After authentication of the user by HMAR 116 is complete, MARR 108 will direct the user to the Visiting (Roaming) Mobile App Register (VMAR) 110. VMAR 110 may be owned and operated by the local provider of service. VMAR 110 uses the authentication provided by MARR 108 to connect to HMAR 116 to:
- obtain the user's service profile
- obtain payment methods
- obtain the roaming agreement between the HMAR operator and VMAR operator
- obtain other necessary information related to the services or payment methods FIG. 2 shows the interaction between HMAR 116 and VMAR 110 to provide the requested services to a user compliant with the terms of subscription as well as with local regulations. In the simplest case HMAR 116 will just acknowledge the user's association with HMAR 116 but provides no other information. In this case the local MASPs, while compliant with all applicable governing regulations, provide the user with the app services and complete the transactions based on direct interaction with the user. All of the user's information, payment methods and management, and class of services will be done by the roaming MASPs.

In the most complex subscription case, HMAR 116 provides all required information to VMAR 110 and may even take responsibility for payment for the service. In this case the VMAR operator will comply with all local regulatory requirements while using the HMAR operator as the source for all required information and payments.

The relationship between the roaming MASP and the home MASP is governed by roaming agreements between the two operators which define the extent of their cooperation in providing service to subscribers. The service roaming agreements where one MASP accepts financial and payment responsibility for services provided by another MASP may need to engage with a clearing house entity.

Mobile App Roaming Clearing house (MARC) 118

The Mobile App Roaming Clearance house (MARC) 118 is an entity that is aware of roaming agreements between MASPs. MARC 118 also deals with currency exchange, roaming overhead charges, and special roaming plans such as one time upfront roaming charges and other arrangements. MARC 118 may accept the responsibility of clearing all charges directly, eliminating the requirement for most or all direct MASP to MASP billing. This means that MARC 118 will directly work with each MASP 106 on behalf of the other MASPs to qualify the roaming of the applications, and then pass and collect the charges on behalf of roaming MASPs which provide the services in addition to roaming and surcharges allowed by the roaming agreement. MARC 118 invoices the home MASP 106 for the service provided by the roaming MASP and directly pays the roaming MASPs.

Figure 3:
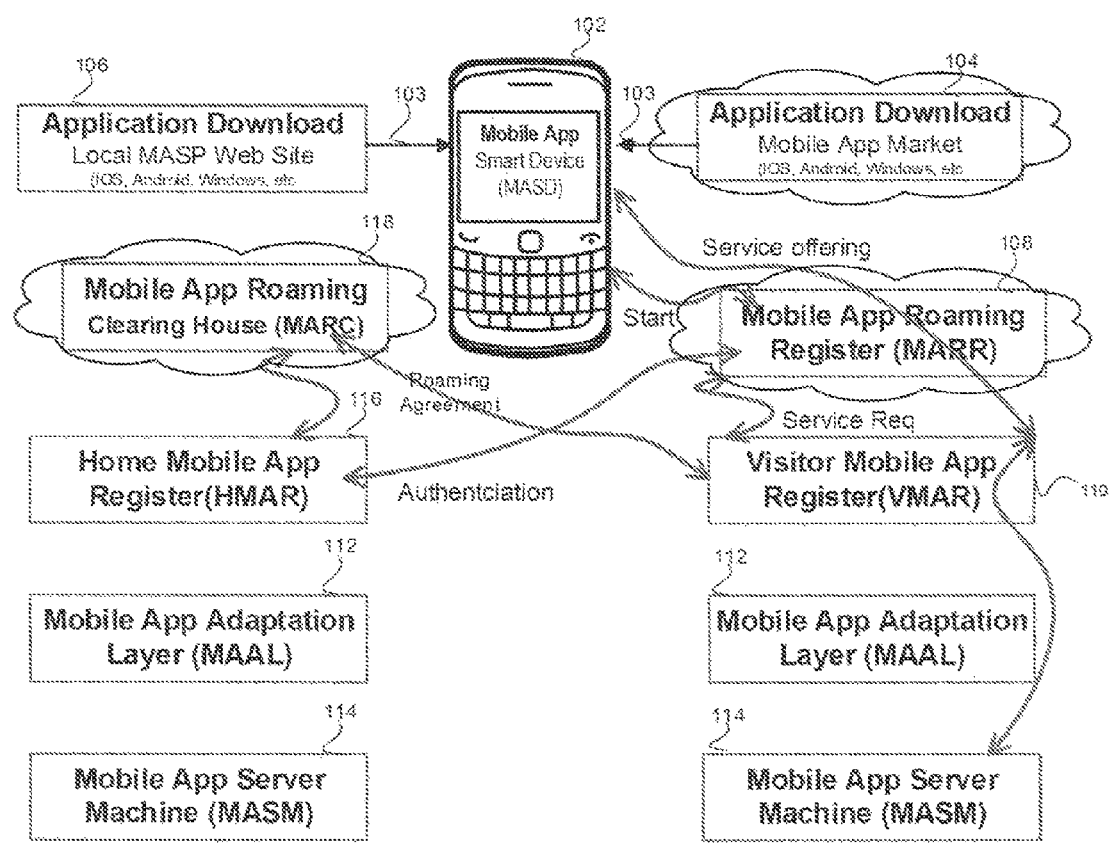
FIG. 3 shows the interaction between the mobile application and the Mobile Application Roaming Register for determining the applicable Visitor Mobile App Register, and the interaction of the Mobile Application Clearing House and the Home Mobile Application register and Mobile Application Roaming Register for charging the home Mobile Application Service Provider.

FIG. 3 shows the flow of protocols at a very high level between the entities, which in this example uses the roaming agreement and clearing house to provide service to a user in a coverage area of a roaming MASP. FIG. 3 shows potential functions and interactions with MARC 118 to allow a user to pay using his account via his home MASP 106. When the app starts up and is directed to MARR 108, the user's credentials are authenticated with his/her HMAR 116. As a part of this authentication, MARR 108 is informed if roaming charges are allowed. After authentication, MARR 108 directs the call to VMAR 110 and inquires if VMAR 110 is willing to accept cross MASP charging. If so, MARR 108 proceeds to complete the service offering accordingly. If both the home MASP and roaming MASP agree to charge the service to the user's home MASP account, then at the end of service, when all charges are determined, the charges are sent to MARC 118 for cross charging of the services. Note that the MARS allows restrictions and limits on roaming agreements to be set either by the value of the service, the type of service, or other attributes. These limits are passed between MARR 108 and HMAR 116 and then between HMAR 116 and VMAR 110, which allows imposing appropriate restrictions on the service by VMAR 110. HMAR 116 also informs MARC 118 of the availability and restrictions of services to allow MARC 118 to control and monitor allowed cross charging.

Mobile App Adaptation Layer (MAAL) 112

The Mobile App Adaptation Layer (MAAL) 112 allows interoperability between various MASP software and business practices. The MARS works directly with an existing or future MASP system offering the mobile app services or services that are accessed by the mobile app. Because the operation and system of these MASPs vary from one to another, in order to allow the same app or one provider's app to work with various service providers' servers and practices, MAAL 112 is designed to adapt MASP 106 to provide a common interface toward the mobile app interface. MAAL 112 is designed to reduce, if not totally eliminate, requirements for a change to the MASP software and operational participation when joining the MARS. MAAL 112 allows a mobile app to invoke a service in a roaming MASP which is after adaptation is sent to the corresponding MASP. MAAL 112 defines the minimum Service Access Points (SAPs) and requirements to interface the MASP system to integrate with the MARS. MAAL 112 may feature a small set of minimum requirements and SAPs and a set of optional SAPs, thereby allowing the MASP to use a minimally featured MAAL or a very extensively featured MAAL. Complying with the minimally featured MAAL may provide adequate services while a fully featured MAAL provides enhancements and a better user experience. If a MASP wishes to offer extensive roaming capabilities and services, it will need to comply with more requirements and may use a complete set of the MAAL messages. MAAL 112 does not perform any significant function when MASD 102 accesses its own home MASP 106.

This function is created because the MARS takes into account that not all MASPs will provide the same level of service, use the same operational dispatch software, or practice the same operations. Additionally, MASP servers may be designed and operated in a variety of operating systems, hardware and languages. MAAL 112 is designed to adapt these variations in service, operating system and other functionality to a standard interface defined by the MARS. MAAL 112 defines the minimum information and the format for required data to be passed in each direction between MASD 102 and MASP 106 server. MAAL 112 also defines optional information and formats for optional and enhancement data to be passed in each direction between MASD 102 and MASP 106 servers. Some of the variations that MAAL 112 allows include:
- Opening pages of MASD 102 to be customized to a combination of home MASP 106 and a roaming MASP. The MASP could chose to provide fully featured opening promotional pages or none at all.
- Branding per pages to combinations of the HMASP 106 and VMASP setups.
- Levels of services provided by combinations of the home MASP 106 permitted by subscription plans and roaming MASP capabilities.

Many additional features that will impact a user's experience, such as methods of providing scoring in the gaming example or the location of vehicles on a map in the transportation example. Speed of update of these data as well as quantity and quality of the date will change the user experience.

At its lowest level of service, the MASP receives an email or text message with requirements for some form of mobile services with an expectation of a return email or return text message.

Mobile App Server Machine (MASM) 114

The Mobile App Server Machine (MASM) 114 is the MASP's local server that contains the service provider's service management software. In the case of a gaming app, MASM 114 is the engine of the game, and in the case of a transportation app, MASM 114 is the MASP's dispatch and route management system machine. MASM 114 is a rule based decision machine providing the designated services in compliance with requirements of local regulations, level of services, quality and quantity of services. When a user requests a service in his/her home coverage area, the rules and service grades are determined by the home MASM 114. However when the user requests service outside of his/her home coverage area, the rules and grade of service are controlled by and made compliant with the local regulations via a roaming MASM 114.

Figure 4:
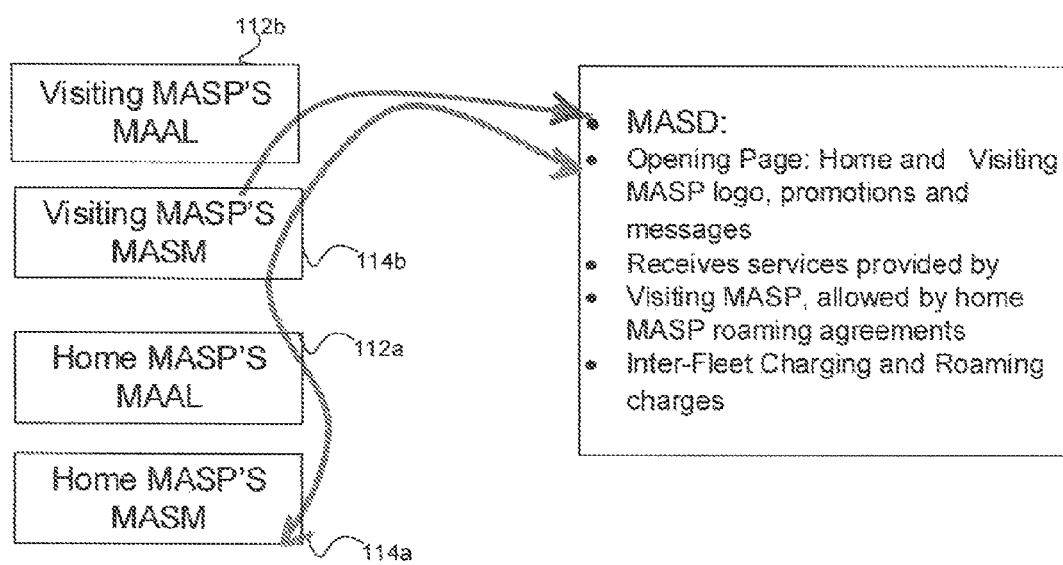
FIG. 4 shows the interaction with the Mobile Application Adaptation Layer for customization to the Visiting Mobile Application Service Provider.

FIG. 4 shows that a roaming MASM 114b and home MASM 114a, by going through MAAL 112b or 112a, can work with the same MASD 102. It also illustrates that when a user receives services from a roaming MASP 106, the system may combine the capabilities, offerings and restrictions imposed by both the home and roaming MASP.

Operation Scenarios—Receiving Services from a Home MASP 106

Figure 5:
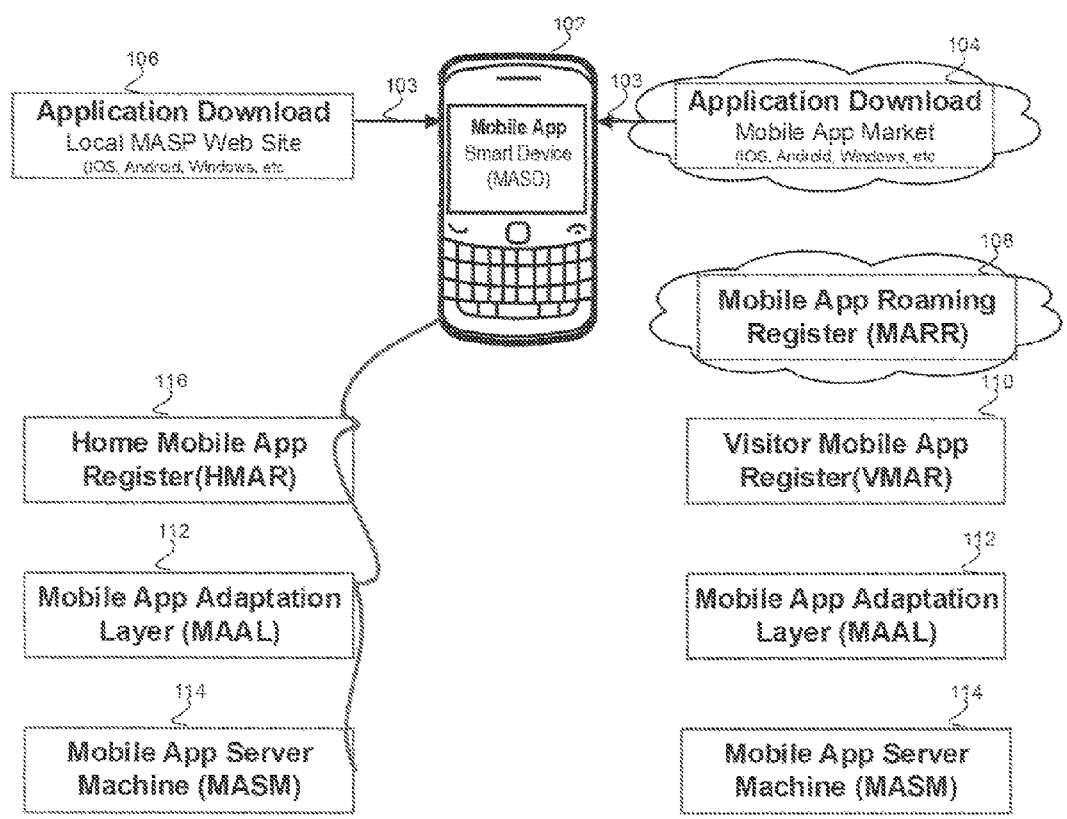
FIG. 5 shows the process of receiving services from the Home Mobile Application Service Provider.

Users of mobile apps may receive their services directly from their home MASP 106, in which case their mobile app locates, directly or through a MARR 108, its HMAR 116 and invokes the required services from the home MSASP's MASM 114a. When MASD 102 invokes its home MASP services, the functionality of MAAL 112 is minimal. FIG. 5 illustrates the simple example of a mobile app logging in and requesting certain services from its home MASP 106 while in the coverage area of its home MASP 106.

Operation Scenarios—Receiving Services from Roaming MASPs

Figure 6:
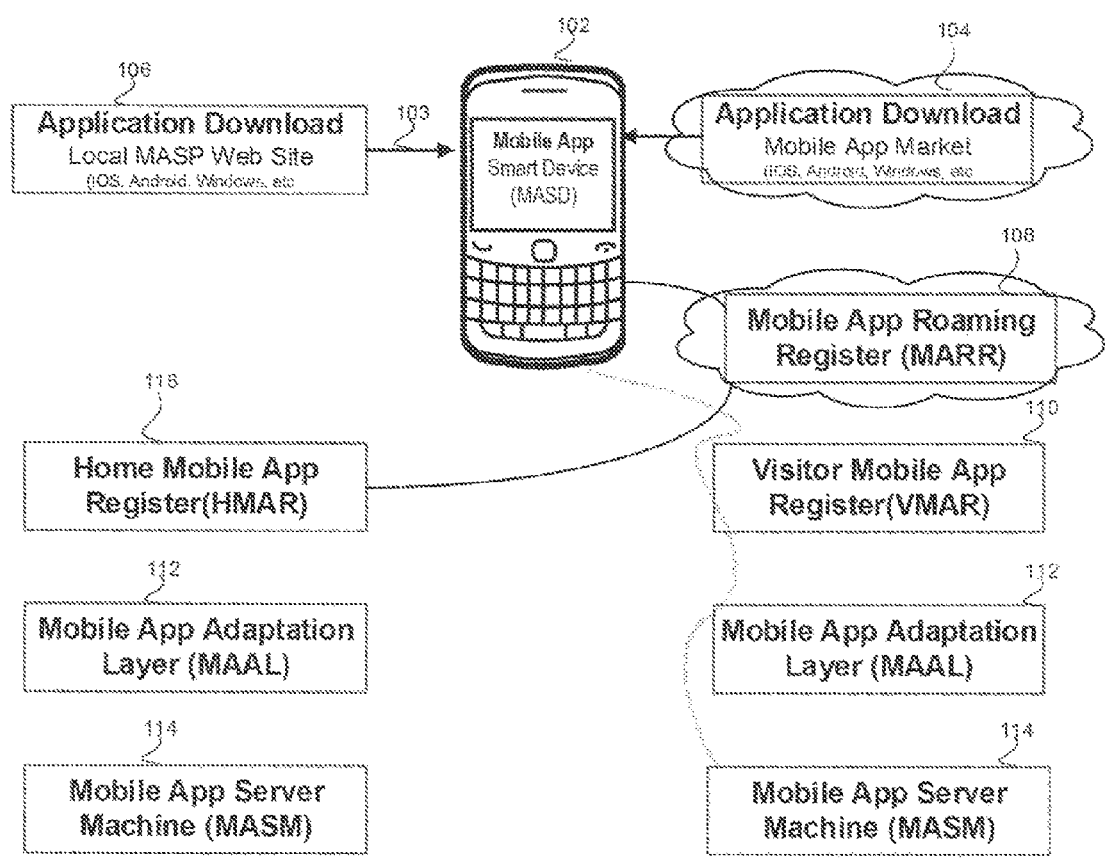
FIG. 6 shows the process of receiving services from the Roaming or Visiting Mobile Application Service Provider.

A user who is not in the coverage area of his/her home MASP 106 and wishes to invoke the same or similar services in a different geographical or coverage area using another MASP will go through a slightly different scenario. The app will determine the exact geographical location of the user via the smart device, e.g., an onboard GPS. The app then provides MARR 108 with its identity and the device identity as well as the geographical location of the user. MAAR 108 then authenticates the user while contacting its HMAR 116. Thereafter, MARR 108 connects MASD 102 to VMAR 110. At this point MASD 102 works with VMAR 110 and its corresponding MAAL 112 to adapt and fulfill the requested service directly from a roaming MASM 114. FIG. 6 shows an example of a mobile app logging into a MAAR 108 and/or a HMAR 116 to authenticate and invoke the user's subscription profile and then request and receive the requested service from a roaming MASP system.

When the user requests a future service for a different area than the current location of the user, the time and location of the requested service will be also provided to MARR 108. MAAR 108 will use either the current location of MASD 102 or the time and location of the future requested service to determine one or more MSAPs that cover the area of the future requested service.

Background to Transportation Booking Applications

Taxicab, limousine, and other transportation services have been well managed by local operators for many years, and are mostly regulated and controlled by local governments. These well managed and most often regulated businesses have been providing safe transportation services to the public for many years with their fares and quality of service monitored and controlled by local jurisdictions.

The wide availability of wireless apps and internet booking has led to a change in practice of booking trip requests into fleet operators in recent years. From a technical point of view, these booking methods are interesting and have brought a healthy debate in the industry amongst the transportation fleet operators, which also reveals the shortcomings and weaknesses in these new booking methods. The next three sections categorize and describe these new booking methods under three classes.

Rogue Booking App

The rogue booking app is defined as a Looking app which is offered and operated by an entity which is not generally licensed or regulated by the taxi commissions or jurisdictional governments as transportation service providers. These apps work directly with a driver's smart device app and allow the rider to directly select a vehicle in the area of pickup. These apps entirely bypass the taxi/limo operation company and they may assign service to a driver who may or may not be a commercially licensed or authorized driver. Because the device is most often owned by the driver, it does not interface with a taxi meter and may not indicate that the vehicle is already occupied; this can lead to shared rides without the knowledge or consent of the riders. In addition, it is not clear in case of an incident or an event, whose insurance liability will cover the event, particularly if the event is not covered by the auto liability insurance policy terms. Jurisdictional authorities, taxicab and limo operators are struggling to figure out how to address these phenomena. Additionally, these apps only allow booking in real time and not for future, standing, or scheduled trips. While this technology appears to provide the public with a new choice, it clearly carries a lot of safety risk for the riders. The technology involved is shallow, and is no more than the old app where some individuals use to find their friends or people with common interests in local bars or a crowd area.

Fleet operators, as regulated entities, find themselves in largely disadvantageous positions to compete with the non-regulated rogue app providers. This disadvantageous position is created because rogue app providers: a) can provide nationwide or even worldwide services; b) charge fares and fees that are not regulated; c) are not required to create equal access to public; and d) do not carry any regulatory burden for insurance or other safety measures. These rogue app services can commit to provide a third world level of taxi operations with minimal to zero regulatory boundaries in a country such as the United States in which riders assume the government has established certain safety measures. Arguably, riders may have a difficult time holding the taxi operation liable for services that are booked via a third party that may not meet the fleet policies or local regulations.

Third Party Booking App

The third party booking app is referred to as an app operated and administered by a third party booking and brokerage operation that becomes a layer between the rider and the fleet operators. These third party booking operations take the reservation requests into their own database and charge the rider at the time of booking using credit cards or other methods of payment. Then, as a middleman, they provide the booking records to a taxi or limo fleet operator. The third party booking app operator's method of selecting fleet operators where multiple fleets cover a geographical area is unclear and is left to the third party app operator's choice. These operations abstract the fleets' brand names and advertise themselves as the service provider. For a fee, these operators re-sell the trip request to local fleet operators.

Local Fleet Operators Private Labeled Booking App

A local transportation fleet operator may choose to design and make its own app and provide it to its patrons. The advantage of this approach is that the fleet operator can take ultimate advantage of the app to advertise its services and brand name. It also gives the operator the advantage of being able to maintain a one-to-one relationship with their riders and maintain their requests. Additionally it provides the fleet operator with the ability to comply with local licensing regulations, jurisdictionally controlled pricing, and company policy. The fleet operator may design its own loyalty programs, manage its private labeled payment cards, offer postpaid service to some of its accounts and provide user-side subsidized services to local governments and insurance companies. The limited coverage area of these apps to one fleet operator and one small area of coverage is disadvantageous. The lack of support from other operators with the area and other areas restricts the marketability of these apps. Additionally, multiple apps are required to cover the needs of a frequent user of fleets in different areas.

Universal Booking App Roaming (UBAR)

The Universal Booking App Roaming (UBAR) is a new and innovative approach that uses the MARS concept to solve the complex issues of allowing riders to book their transportation requests using the convenience and power of their wireless smart device, and does not suffer from the weaknesses of previous approaches. It offers the universal availability of booking apps and yet the security of booking directly with a local licensed transportation fleet operator. Additionally, it offers an extensive upside in providing additional services and enhancing the global transportation service as roaming agreements expand to cover additional services. UBAR designs a global network of inter-operating transportation fleets, each using its own policies and practices compliant with local regulations. A design approach for this powerful inter-booking system will be described in more detail below and in line with the MARS design.

Analysis of Impacts of Booking Apps Approaches

In recent years, the advent and wide availability of public wireless data and common use of powerful 3G/4G smart devices has led to the appearance of a number of rogue applications that bypass the fleet operators of these services and directly connect the rider to driver in the area. These apps sell subscriptions to drivers and advertise their services to the public and riders bypassing fleets owners, operation management and the whole dispatch process. While some of these drivers may be licensed taxicabs or limousines drivers some may not be licensed, managed by a fleet, or be covered by proper, insurance. The government regulations and fleet policies that monitor and control the drivers and operation of fleets were designed to protect the public, regulate fares, and provide equal access for all citizens of a given geographic area. Reduced enforcement and monitoring of these regulations may lead to arbitrary fares, selective service provisioning and reduced safety for the public. The appearance of these apps in the transportation market has resulted in a great deal of confusion on all fronts. Riders use these apps assuming they will receive the same or a similar level of protection designed into the public transportation system as before with proper safety measures, fare control and insurance. Taxi and limo fleet operators find themselves in a dilemma because while they do not manage the requests performed by their drivers received from these rogue apps, they find themselves responsible and liable for incidents and quality of services. While the service is received and passed to their drivers by another entity they are fully responsible to comply to regulations and must answer to local licensing authorities. For example, they are regulated to limit their services to certain areas for pickup and drop off while they do not receive or control dispatching the trip requests.

UBAR addresses a significant technical disadvantage that fleet operators have suffered in competing with rogue app operators. It allows the fleet operators to provide a universal booking spp with roaming capabilities that allows a user to book transportation services nationwide or even worldwide. UBAR allows riders to book a taxi or other forms of transportation directly anywhere in the world while being assured the requested service is fulfilled by a locally licensed transportation operator who is participating in a global roaming agreement. The main reason for this technical advantage is that the UBAR solution not only provides the power of universal global booking, but also uses the regulated safe services of a well-managed fleet operator. Because UBAR directly books the service with the local fleet operator dispatch system, it maintains the operator's integrity of monitoring the services and its responsibilities and liabilities.

There have been previous attempts by third party booking companies to create a nationwide booking app and method that offers reservations to a fleet operator's dispatch system. These third party operators used their own central servers and brand names for the service. They in turn sold the booked trips to local operators for certain fees and unknown rules of determining the selection of fleets. The main disadvantages of third party booking are dilution of a fleet operator's brand name, a loss of its regular customers, and diminished customer loyalty. The UBAR resolves these disadvantages by: a) booking the trip under the home MASP 106 (the rider's home transportation operator) and roaming MASP 106 (transportation operator in a roaming location); b) leaving the charging and fares policy totally to the roaming operator; and c) maintaining the local transportation operator's integrity of quality of service, responsibilities and liabilities.

Individual transportation fleet operators have attempted to address concerns about rogue apps as well as third party booking shortcomings by providing their patrons with an app to book their own trips. This method has the advantages of creating a brand name, brand recognition, as well as customer loyalty in a local area market. Because these apps are customized to company operation and policies, they comply with all jurisdictional regulations. These locally driven apps, however, are hard to market and maintain. In addition, because they do not provide portability to the coverage area of any other fleet operators, they do not meet customer expectations. Customers generally like help with their bookings when they are outside of the coverage area of their familiar fleet operators.

UBAR responds to these concerns and provides solutions to the weaknesses of each of these approaches. It offers the strong points of each approach while removing the concerns and weaknesses of each of these systems.

1. UBAR provides the global accessibility of rogue apps. A single app can be launched almost anywhere in the world there is internet coverage to find local participating licensed operators. It directly books trips into the local operator system, considering company policies and thereby the jurisdictional regulations administered by the company. It protects the riders by keeping all liabilities and responsibilities at the fleet operator's level which is introduced to the rider via a direct interface to a company's system.

2. UBAR provides the national accessibility and uniform look and feel of third party booking app providers without creating a middle man customer list and broker. Customer information is directly entered into VMAR 110 and MASM 114. There is no additional system of policies and operations or fare modifications which may not match those of the operating company providing the actual transportation service.

3. UBAR also responds to weaknesses of local operators, having home brewed apps which are applicable only to a local market. The UBAR makes the booking app available and useful globally. Furthermore, UBAR allows for roaming agreements between fleet operators. While adding additional security and protection for riders, it allows for inter fleet charging. It allows a fleet operator in Los Angeles to sell services in Hong Kong or Bangkok with simple direct roaming agreements. Roaming agreements could be as simple as the fleet operator in Los Angeles allowing their patrons to book a taxi ride in Bangkok while in Los Angeles, using the app which they may use on daily basis to book a taxi in Los Angeles. On the other hand, the roaming agreements could be as extensive as allowing the charges for taxi rides in Bangkok to be charged in US currency to the user's taxi account with the Los Angeles fleet operator. UBAR unleashes the ability of local transportation fleet operators to extend the marketing reach of their services to other jurisdictions without the burden of acquiring local license or foreign country business setups. UBAR is a vehicle for mutual or one way inter-booking (roaming) agreements using the power of the Internet and wireless data to allow seamless, and yet direct booking into participating transportation fleets operators, coining the term Inter-book.

UBAR Features and Advantages

UBAR solves the technical problems of providing a single booking app having the advantages of global access and operation while maintaining control and liability with locally licensed service providers. Some key features of UBAR are:

1. It is nationwide or even global; the same app can operate in various jurisdictions seamlessly.
2. It provides private labeling and acts very similar to a local fleet operator's private labeled app.
3. The requests for trips are directly entered into the home fleet operator's dispatch system.
4. It allows full compliance with the roaming fleet operator's regulatory and company policy as monitored by its own dispatch and trip reservation system.
5. It allows for fleet advertising and creating brand name recognition locally and globally,
6. It allows for promotion of fleet based loyalty cards and programs and allows it to be extended to partner fleets.
7. It allows for fleet based managed pre-paid and postpaid accounts and user-side subsidized accounts.
8. The cost of a trip is estimated based on the fleet operator's jurisdictionally controlled prices and is charged to the customer based on the regulated rates.
9. Allows booking without pre-payment and to be paid at the time of ride per the service provider's service policies.
10. It allows small companies with or without electronic dispatch to participate and use the app.
11. The company patrons will only see the home operator's fleets and their own previous booking records.
12. The subscriber profile and credentials will be kept only in the home fleet operator's database and the UBAR may only re-direct the related booking and allowed other data to a selected roaming operator's dispatch systems.

UBAR Concept of Operation

The UBAR is based on previously described MARS generalized services design. All of the MARS concepts and components apply to the UBAR as well. The mapping of terminologies of the MARS to the UBAR is shown in the following table:

| MARS Terms | Function in MARS | Function in UBAR |
|---|---|---|
| MASD | Mobile App Smart Device user to invoke certain mobile applications | Mobile App used to Reserve a transportation services |
| MASP | Mobile App Service Provider | Fleet Operators with capability to provide transportation services |
| MARR | Mobile App Roaming Register - Determines based on geography of requested service which MASP will cover the service | A server that either knows or can inquire about the transportation coverage area of each fleet operator in a roaming network. |
| HMAR | Home Mobile App Register; a server or registry of customers and their profiles | A registry of customers of fleet operators with their profiles, terms of payments and roaming agreements |
| VMAR | Roaming Mobile App Registry, the registry of mobile app service providers in the roaming area of the user. | Part of dispatch system of Transportation fleet operators which holds the information of roaming subscribers and their roaming allowances with their home fleet operators |
| MAAL | A layer of protocol defined to allow various service providers work with a common app | A layer of software the participating operator's dispatch system will interface with to work with a common app |
| MASM | The service provider server or practices providing the services requested by the Mobile App | Fleet operators dispatch system or dispatch practices responding to the requested services by MASD |

Some of the UBAR concepts of operations and procedures and interworking are described below:

1. A Universal Booking App for Smart Devices (MASD) 102 is designed to work with all participating fleets' dispatch systems nationwide or globally. The functionality and user experience of MASD 102 will be determined by the amount of features supported by MASPs and may vary from one MASP 106 to another.
2. MARR 108 (a server/computer in the cloud) which has the list of all participating fleets of taxi, limousines, sedans or other transportation services providers (MASPs)
3. Each participating MASP 106 defines a number of geographical coverage areas for their service which is consistent with their jurisdictional service requirements and regulatory mandates.
4. MASPs 106 may break down the coverage areas into primary and secondary area defined as follows:
   a. Primary coverage areas are those which the company believes they will often have vehicles available; and
   b. Secondary coverage areas are those areas where there may be available vehicles but with a lower chance than primary coverage areas.

5. The Universal Booking App is designed and sold/or offered to the public as a single app designed for all MASPs 106 in the country or even world-wide or by a fleet for its own patrons compliant with the UBAR interface to allow roaming to other operators.
6. The MASD 102 interface is open and standard allowing multiple providers of MASDs 102 to provide apps for a variety of devices and operating systems. This also provides for new MASPs 106 to be created as times goes on as long as they comply with the open interface.
7. When a user starts the app on their MASD 162, the following sequence of interactions will occur:
   a. The smart phone or other smart device, aware of the user's location (e.g., based on its built-in GPS), will immediately contact HMAR 116 or MARR 108 to find a participating MASP 106 covering the location of the service requested.
   b. MASD 102 will directly connect to VMAR 110 which, in conjunction with the MASD's HMAR 116, will determine the user service profile and roaming agreement profile, including payment methods covered.
   c. If the user does not wish to book the trip for the current time or from current location, the user will provide the UBAR with the user's requested time, pickup and drop off locations. Accordingly, the system determines the corresponding the MASP that matches those criteria.
8. Mobile App Adaptation Layer (MAAL) 112 adapts the local fleet operators capabilities and dispatch system to the MASD 102 interface. Thus various fleet operators can interface with the same MASD 102 without modifying their dispatch system of dispatch practices.
   a. MAAL 112 is open source code and is available to all fleet operators to include in their dispatch system or interface with their dispatch practices.
   b. MAAL 112 has optional fields to allow fleet operators and their dispatch systems to offer full featured interfaces or low level features for MASD 102 displays.
9. The UBAR opening page completes the following steps:
   a. Displays the log and promotional pages of the user's home service provider, or virtual service provider, whichever applies;
   b. only determines if user wishes to:
      book a trip from their current location at the current time, or
      book a trip in the future and/or from a different location; and
   c. Based on the information provided, the UBAR directs the user's MASD 102 to a VMAR 110 and HMAR 116 to complete the user profile as needed and prepare to provide seamless service to the user.
10. The UBAR allows for mechanisms for both home fleet operators and roaming service operators to provide promotional pages of their own when the mobile app is connected and the UBAR has determined its HMAR 116 as well as its VMAR 110.
11. MAAL 112 reformats and provides MASD 102 with the roaming fleet operator's information and status as they may apply and as they may be available, including:
   a. Location of vehicles on the map;
   b. Status of vehicles at that time such as full, empty, en route to pickup or drop off, rank in the zone;
   c. Driver name, gender and picture; and
   d. Other information as is may apply.
12. Users may select the fleet or a specific taxi if multiple fleets or taxis are available, which leads to
   a. Bookings go directly to the selected MASP dispatch system;
   b. The MASP dispatch system provides the user with an estimated arrival time at the pickup location;
   c. The MASP dispatch system may provide the user with an estimate for the fare amount; and
   d. The MASP dispatch system provides the user with the option to select a payment method, such as:
      Credit card via the app;
      Credit card in the car;
      Cash in the car;
      Postpaid accounts which will be authenticated;
      Other payment method(s).
13. MASP 106 may periodically provide messages to the user indicating the progress of fulfillment of service, such as status of assignment of the requested resource, and the progress of the vehicle toward the pickup location on the MASD maps.

For smaller fleets without an electronic dispatch system, the app may send a text message or Instant Message IM to a fleet operator and provide the user with a response to the text or IM.

MARR 108 Functions

The MARR functions in the UBAR are analogous to its function in MARS. MARR 108 comprises one or more servers acting as a central depository database of all participating fleet members, their coverage areas, and certain participation agreement rules. Ultimately MARR 108 could be designed into the fabric of the UBAR so that each HMAR 116 has the information of all other participating fleets and can provides its subscriber the information about VMAR 110 covering the requested location. Similar to the cellular system concept of a Roaming Location Register (VLR) which is designed to take care of roaming cell phones from another cellular operator, VMAR 112 takes care of roaming transportation requests. The steps that accommodate the roaming of transportation requests may be summarized as follows:

MASD 102 first checks the current location of a user; if within the user's home MASP 106, then MASD 102 will try to fulfill the request from the home MASP 106.
   If the home MASP 106 cannot fulfill the request, then MASD 102 will clarify with the app user if "the request is for now and current location" or for "another time", or "different location".
   For requests that are for "Current Time and Location," the UBAR directs the app user's request seamlessly to the operational environment of a participating fleet that covers the user's current location.
   For other Times or Locations, MARR 108 will resolve and direct the call to one or more corresponding participating fleet operators available at the "other Times or Locations" after receiving the time and location request.
   The options for providing look and feel as well as a user experience that is defined by either the home MASP 106 and/or Roaming MASPs, the UBAR offers a flexible set of optional greeting windows and opening pages including:
      Allowing the participating fleet operators who have their own booking app to take over the screens, providing their own logos, promotions and advertisements. Their agreements may even allow uploading their own app to complete the booking.
      Those operators who prefer to use universal MASD 102 may delegate the booking to the system provided screens and infrastructure. For these fleets the UBAR allows for fleet logos, promotions and advertising.

The UBAR then provides a common GUI to take the trip request and directly provide the request information to the participating fleet designated to this trip.

If the member operator's fleet does not use an electronic dispatch system, then the booking record will be provided to them via Short Message System (SMS) or email or other means. The design also allows for direct communication of the app with the driver that fleet operator has provided to the UBAR.

MARR 108 defines one or more geographical coverage areas for each fleet operator.

The fleet operators may define primary and secondary coverage areas for themselves.

Figure 7:
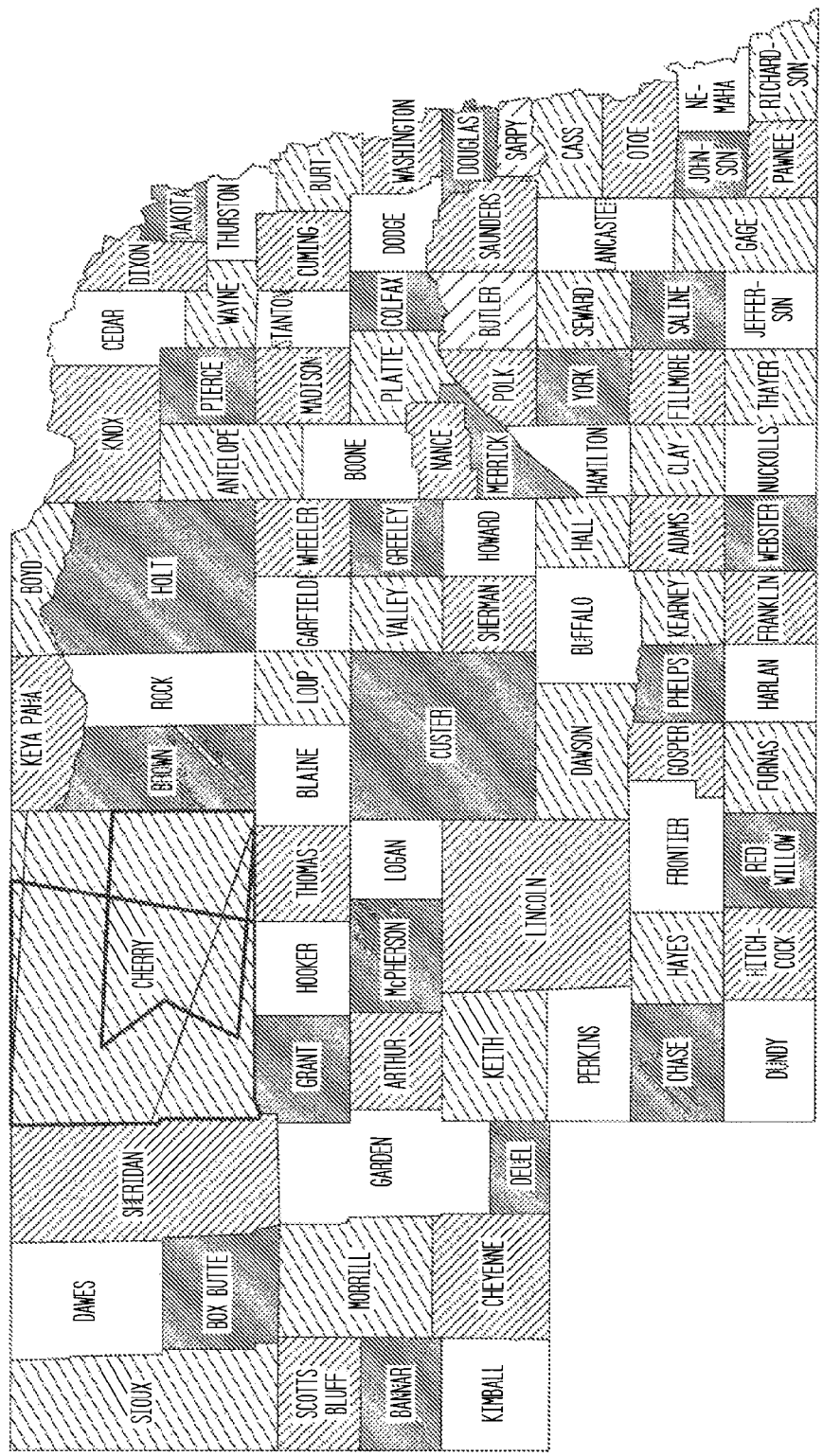
FIG. 7 shows an example of overlapping coverage areas for the Universal Roaming Booking Application.

MARR 108 allows for overlapping coverage areas. For example, FIG. 7 shows that Cherry County, Nebr. is served by three fleet members.

Figure 8:
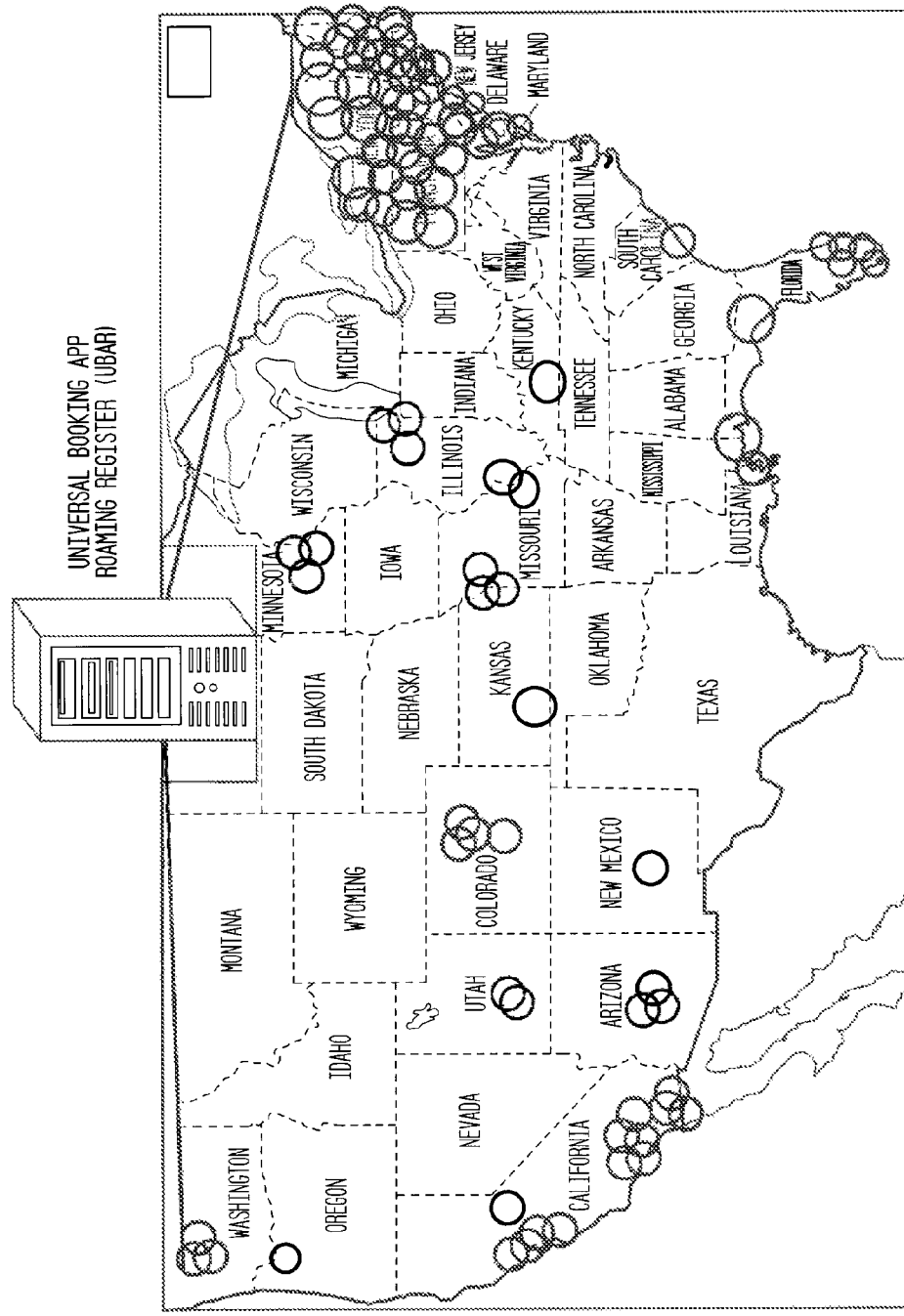
FIG. 8 shows an example of national overlapping Mobile Application Service Providers coverage areas.

FIG. 8 depicts the concept of application roaming in the context of a transportation reservation system. The UBAR system collectively is aware of the coverage area of each of the fleet service providers licensed in that coverage area. That means either each participating member periodically updates its HMAR 116 to be able to direct its subscriber to appropriate fleet operators that cover the requested service or a central depository will manage the function of MARR 108 for all service provider. A hybrid approach also is possible, where each HMAR 116 updates its database of participating fleets and their coverage as well as their attributes, while a Virtual Mobile App Service Provider (VMASP) covers the smaller members with less computing and IT capabilities.

In these examples, when a user wishes to book a transportation service, he/she starts their app. The app automatically contacts the home MASP 106. Based on the content of the request, the home MASP 106 determines either to book the trip directly or, if the request is not in its own coverage area, refers it to a participating MASP 106 that covers the area of the request. HMAR 116 either directly checks its own depository of MASPs to direct the request to another roaming partner, or, if it cannot locate another roaming partner, defer the request to MARR 108. MARR 108 in turn searches for a participating MASP 102 in its database and directs the request to a MASP 102 that covers the request.

The inventive system can equally address users' requests that are looking for neighborhood drivers for ride-sharing (e.g., to work or other events). The design of the system is general and can direct the app to a local database of shared ride requests to allow ride sharing. In FIG. 8, each circle (which in reality may be any shape) represents an area of coverage of a fleet or ride sharing neighborhood.

Function of MAAL 108 for Transportation

MAAL 108 allows for interworking of multiple fleet operators with a number of different dispatch software packages. MAAL 108 allows some operators to provide a minimal amount of information which leads to user receiving less information and possibly a less satisfying user experience. Other operators may decide to comply and supply all optional information fields leading to a richer user experience.

Required information at a minimum for booking a trip includes:

Pickup location latitude and/or longitude or address.

For better results and a better user experience, the UBAR provides optional fields and additional messages and service access points including:

From MASD to System:
Drop off address and/or latitude and longitude;
Selection of a vehicle on the map and sending its information back to the system;
Pressing on the map creates a pin or other indicator which can be sent back to the system for pickup or drop off;
Requested time for pickup;
Requested time for drop off;
Attributes of the trip request, including vehicle type, driver gender, payment type;
Stop locations and time for each; and
Rider's detailed information, including name, email, phone number, credit card or other payment information.

From System to MASD:
List of vehicles in the area and their latitude and longitude to be mapped or shown to the user;
Color and types of vehicles in the area;
Icon to show the vehicles in the area;
Fleet's logo, and colors;
Fleet's promotional material;
Estimated time of arrivals at pickup location;
Periodic update of the list of vehicles and their latitudes and longitudes to be shown to the user;
Vehicle detailed information including type, capacity, color, number, and/or driver information, including photo and ID; and
Other information as appropriate.

CONCLUSION

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A mobile application roaming method, for enabling subscription-based universal booking applications which are location-dependent, comprising:

establishing a user's subscription profile for a subscription-based mobile universal booking application service with a first mobile application service provider, stored in one or more servers designated a Home Mobile Application Register ("HMAR");

the user moving to, or requesting service at, a location wherein the first mobile application service provider does not provide the desired service;

and wherein a second mobile application service provider circuitry does provide the subscribed service;

the subscription-based mobile universal booking application accessing one or more servers designated a Universal Booking Application Roaming Register ("UBARR"), embodied on a non-transitory computer readable medium, wherein the UBARR connects the subscription-based mobile universal booking application to the second mobile application service provider, while accessing the user's subscription profile from the HMAR requesting service directly from the second mobile application service provider by a subscription-based mobile universal booking application using the subscription-based mobile universal booking application service; and enabling an exchange of information between the user and the second mobile application service provider, wherein the second mobile application service provider receives the user's subscription profile from the UBARR and HMAR and wherein the user receives required and allowed service information from the second mobile application service provider;

to enable the subscription-based mobile universal booking application to function with the second mobile application service provider as though the subscription-based mobile universal booking application service were operating within the service area of the first mobile application service provider consistent with the requirements of the second mobile application service provider.

2. The mobile application roaming method according to claim 1, further comprising: defining the service available to the user by the second mobile application service provider based on at least one of local regulations, local laws, local tariffs, local currencies, and local taxes applicable to the service in the service area of the second mobile application service provider.

3. The mobile application roaming method according to claim 2, wherein: the subscription-based mobile universal booking application service comprises a gambling application, where each gambling service provider is restricted by regulations, law, or license to serve only users in a particular geographic region, and the user is located in that particular geographic region at the time of gambling.

4. The mobile application roaming method according to claim 2, wherein: the subscription-based mobile universal booking application service comprises a transportation booking service, where each transportation service provider is restricted by regulation, law, or license to serve only users in a particular geographic region, and the user is located in that particular geographic region at the time of service.

5. The mobile application roaming method according to claim 2, further comprising; invoking a location-based service associated with the subscription-based mobile universal booking application in which the location and attributes of service is regulated by local regulations and laws.

6. The mobile application roaming method according to claim 3, 4, or 5, further comprising: attempting to establish an operative connection to the first mobile application service provider; and requesting service for the mobile application service from the second mobile application service provider if an operative connection cannot be established with the first mobile application service provider.

7. The mobile application roaming method according to claim 1, further comprising: downloading the subscription-based mobile universal booking application to the user's wireless mobile device before establishing the user's subscription profile with the first mobile application service provider; and operatively installing the subscription-based mobile application in the user's wireless mobile device after downloading the mobile application to the user's wireless mobile device and establishing the user's subscription profile with the first mobile application service provider.

8. The mobile application roaming method according to claim 7, further comprising: sending to the UBARR user requested service information; and sending to the second mobile application service provider the user requested service information.

9. The mobile application roaming method according to claim 1, wherein: the subscription profile comprises at least one of user identification, account information, charging or payment mechanisms, and user's service.

10. The mobile application roaming method according to claim 1, further comprising:

before requesting service for the subscription-based mobile universal booking application service from the second mobile application service provider, transmitting at least one of location information of the wireless mobile device, location of requested service, or the user subscription profile to the UBARR; and receiving at the wireless mobile device service information for the second mobile application service provider to enable the mobile application to operatively communicate with the second mobile application service provider.

11. The mobile application roaming method according to claim 1, further comprising: operating the subscription-based mobile universal booking application service with the second mobile application service provider in accordance with the required and allowed service received from the second mobile application service provider in combination with the user subscription profile.

12. The mobile application roaming method according to claim 1, further comprising: accessing the second mobile application service provider for the subscription-based mobile universal booking application service via a mobile application adaptation layer to adapt the services for the second services provider to the user's subscription-based mobile application.

13. The mobile application roaming method according to claim 1, further comprising: communicating with a mobile application clearing house to reconcile inter-service-provider charges between the first and second mobile application service providers resulting from use of the subscription-based mobile universal booking application service.

14. The mobile application roaming method according to claim 1, further comprising: directing the subscription-based mobile universal booking application service request to the second mobile application service provider as a function of the geographic location of the second mobile application service provider and the geographic location of the requested service.

15. A mobile application roaming system, for enabling subscription-based universal booking applications which are location-dependent, comprising:
a plurality of non-volatile computer readable media having non-transitory computer logic stored therein;
establishing a user's subscription profile for a subscription-based mobile universal booking application service with a first mobile application service provider, stored in one or more servers designated a Home Mobile Application Register ("HMAR");
the user moving to, or requesting service at, a location wherein the first mobile application service provider does not provide the desired service;
and wherein a second mobile application service provider circuitry does provide the subscribed service;
the subscription-based mobile application accessing one or more servers designated the Universal Booking Application Roaming Register ("UBARR"), wherein the UBARR connects the subscription-based mobile universal booking application to the second mobile application service provider, while accessing the user's subscription profile from the HMAR;
requesting service directly from the second mobile application service provider by a subscription-based mobile universal booking application using the subscription-based mobile universal application service; and
enabling an exchange of information between the user and the second mobile application service provider, wherein the second mobile application service provider receives the user's subscription profile from the UBARR and HMAR and wherein the user receives required and allowed service information from the second mobile application service provider;
to enable the subscription-based mobile universal booking application to function with the second mobile application service provider as though the subscription-based mobile universal booking application were operating within the service area of the first mobile application service provider consistent with the requirements of the second mobile application service.

16. The mobile application roaming system according to claim 15, wherein the computer program logic, when executed by the computing device, cause the mobile computing device to perform the following additional operations, including:
defining the service available to the user by the second mobile application service provider based on at least one of local regulations, local laws, local tariffs, local currencies, and local taxes applicable to the service in the service area of the second mobile application service provider.

17. The mobile application roaming system according to claim 16, wherein the computer program logic, when executed by the computing device, cause the mobile computing device to perform the following additional operations, including:
cause the subscription-based mobile universal booking application service to comprise a gambling application.

18. The mobile application roaming system according to claim 16, wherein the computer program logic, when executed by the computing device, cause the mobile computing device to perform the following additional operations, including:
cause the subscription-based mobile universal booking application service to comprise a transportation booking service.

19. The mobile application roaming system according to claim 15, wherein the computer program logic, when executed by the computing device, cause the mobile computing device to perform the following additional operations, including:
invoking a location-based service associated with the subscription-based mobile universal booking application in which the location and attributes of service is regulated by local regulations and laws.

20. The mobile application roaming system according to claim 17, 18, or 19, wherein the computer program logic, when executed by the computing device, cause the mobile computing device to perform the following additional operations, including:
attempting to establish an operative connection to the first mobile application service provider; and
requesting service for the subscription-based mobile universal booking application service from the second mobile application service provider if an operative connection cannot be established with the first mobile application service provider.

21. The mobile application roaming system according to claim 15, wherein the computer program logic, when executed by the computing device, cause the mobile computing device to perform the following additional operations, including:
before requesting service for the subscription-based mobile universal booking application service from the second mobile application service provider, transmitting at least one of location information of the wireless mobile device or the user subscription profile to the UBARR; and
receiving at the wireless mobile device service information for the second mobile application service provider to enable the mobile application service to operatively communicate with the second mobile application service provider.

22. The mobile application roaming system according to claim 21, wherein the computer program logic, when executed by the computing device, cause the mobile computing device to perform the following additional operations, including:
sending to the UBARR user identification information; and sending to the second mobile application service provider the user identification information.

23. The mobile application roaming system according to claim 15, wherein the computer program logic, when executed by the computing device, cause the mobile computing device to perform the following additional operations, including: causing the subscription profile to comprise at least one of user identification, account information, charging or payment mechanisms, and user's service preferences.

24. The mobile application roaming system according to claim 15, wherein the computer program logic, when executed by the computing device, cause the mobile computing device to perform the following additional operations, including:
downloading the subscription-based mobile universal booking application to the user's wireless mobile device
before establishing the user's subscription profile with the first mobile application service provider; and operatively installing the subscription-based mobile universal booking application in the user's wireless mobile device after downloading the subscription-based mobile universal booking application to the user's wireless mobile device and establishing the user's subscription profile with the first mobile application service provider.

25. The mobile application roaming system according to claim 15, wherein the computer program logic, when executed by the computing device, cause the mobile computing device to perform the following additional operations, including:
   operating the subscription-based mobile universal booking application service with the second mobile application service provider in accordance with the required and allowed service received from the second mobile application service provider in combination with the user subscription profile.

26. The mobile application roaming system according to claim 15, wherein the computer program logic, when executed by the computing device, cause the mobile computing device to perform the following additional operations, including:
   accessing the second mobile application service provider for the subscription-based mobile universal booking application service via a mobile application adaptation layer to adapt the services for the second services provider to the user's subscription-based mobile application.

27. The mobile application roaming system according to claim 15, wherein the computer program logic, when executed by the computing device, cause the mobile computing device to perform the following additional operations, including:
   communicating with mobile application clearing house to reconcile inter-service-provider charges between the first and second mobile application service providers resulting from use of the mobile application service.

28. The mobile application roaming system according to claim 15, wherein the computer program logic, when executed by the computing device, cause the mobile computing device to perform the following additional operations, including:
   directing the mobile application service request to the second mobile application service provider as a function of the geographic location of the second mobile application service provider and the geographic location of the requested service.

* * * * *